UNITED STATES PATENT OFFICE.

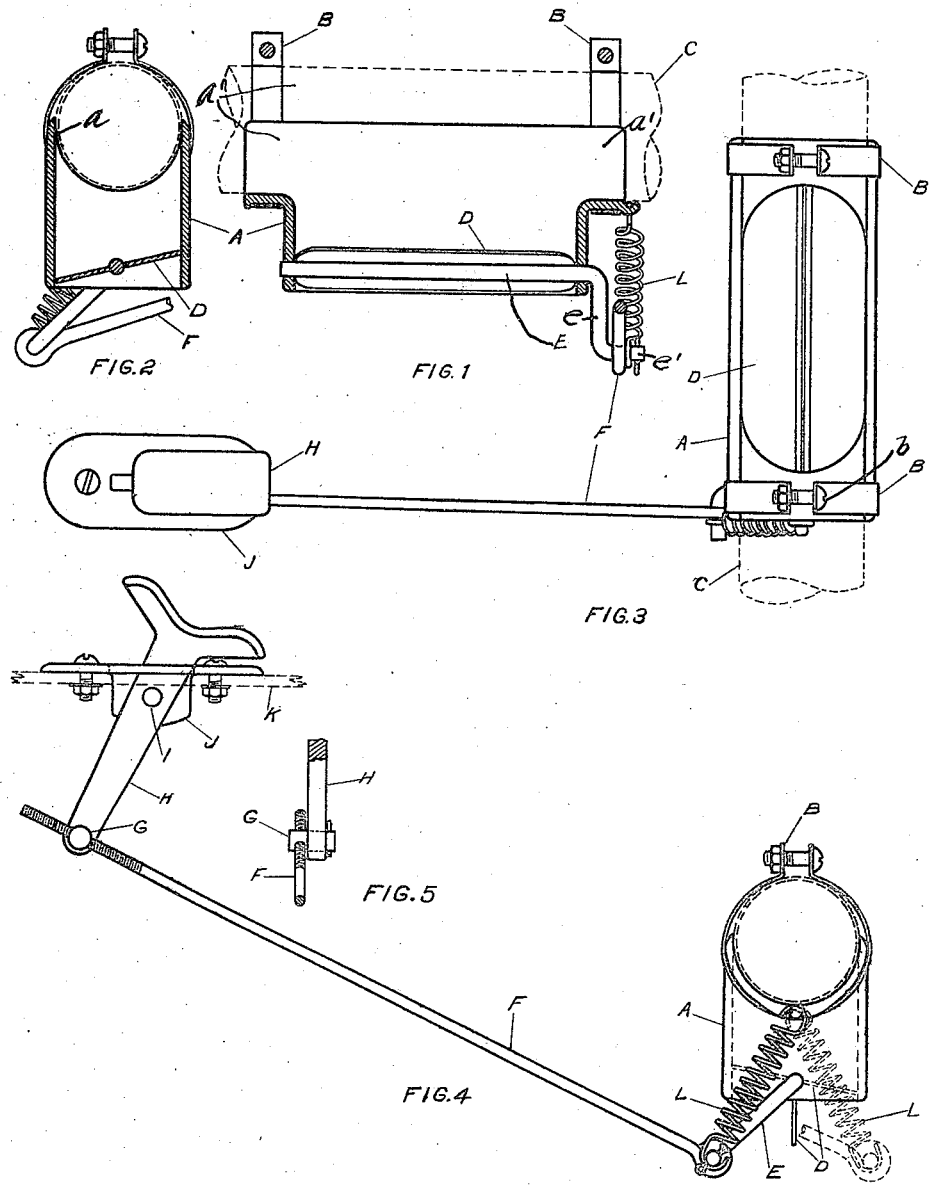

JOHN MOTT MORSE, OF SYRACUSE, NEW YORK.

MUFFLER CUT-OUT.

1,422,466. Specification of Letters Patent. Patented July 11, 1922.

Application filed February 28, 1919. Serial No. 279,903.

*To all whom it may concern:*

Be it known that I, JOHN MOTT MORSE, a citizen of the United States, and a resident of Syracuse, in the county of Onondaga and State of New York, have invented a certain new and useful Muffler Cut-Out, of which the following is a specification.

This invention relates to improvements in muffler cutouts for internal combustion engines, and has for its object a particularly simple and efficient muffler cutout which can be readily applied to the exhaust pipes of engines. Other objects will appear throughout the specification.

The invention consists in the combinations and constructions hereinafter set forth and claimed.

In describing this invention, reference is had to the accompanying drawings in which like characters designate corresponding parts in all the views.

Figure 1 is a vertical longitudinal sectional view of my muffler cutout, the contiguous part of the exhaust pipe being shown.

Figure 2 is a vertical sectional view taken centrally of Fig. 1.

Figure 3 is a plan view of the muffler cutout and the operating means therefor.

Figure 4 is an elevation looking upwardly, of parts seen in Fig. 3. Fig. 5 is a view of a detail.

This muffler cutout comprises generally, an elongated body or receptacle having a passage therein arranged in alinement with an elongated opening in the exhaust pipe, the body being arc-shaped on its lower side in order to seat astride on the pipe and having extensions or arc-shaped or part cylindrical flanges at its ends for seating on the pipe beyond the ends of the opening in the pipe, means coacting with the flanges for attaching the body to the pipe, a damper in the pipe, and means for operating the damper.

A designates the elongated body or receptacle which is mounted upon the exhaust pipe C having an elongated opening therein, the body being shown as arc-shaped at $a$ on its side adjacent the pipe C and having extensions or flanges $a'$ at its ends which seat upon the pipe C. The body $a$ is here shown as clamped onto the pipe by suitable means as straps B passing over the flanges $a'$ and around the pipe C and held together in any suitable manner as by screw bolts $b$ passing through ears at the ends of the straps.

D designates the damper which is mounted upon a rock shaft E extending lengthwise of the opening in the body $a$ and journaled in the opposite end walls of the body, the shaft having a crank $e$ at one end.

The damper is operated by means of a suitable lever as a pedal H attached in any suitable manner to a support as a floor K of a motor vehicle, this pedal being shown as pivoted at I to a bracket J secured to the floor.

The operating means further includes a rod or other connection F between the lower arm of the lever H and the crank $e$ of the shaft E and a spring arranged to move the damper to either its open or closed position after the crank E has passed half way from either one of its extreme positions to the other.

The rod F is adjustable endwisely so that it can be readily adapted to the particular situation in which the device is mounted, and as here shown it is threaded at one end and turns through a pin G at the lower end of the lever H.

L designates the spring which is here shown as a coiled tension spring connected at one end to the crank pin $e'$ and at its other end to the body A at a point in line with the crank $e$ when it is in half way position. Thus during the movement of the foot pedal H in one direction or the other, the spring L is tensioned during the movement of the crank $d$ from one extreme position to its half way position, and when the crank passes slightly beyond its half way position, the spring L recoils and moves the crank to its other extreme position.

This device is particularly advantageous in that it can be readily attached to the exhaust pipes and further in that owing to the arrangement of the spring L and foot lever H the cutout is readily opened and closed and held in either of its open or closed positions without the use of latches, etc.

What I claim is:

A muffler cutout comprising a body formed with an elongated base, and an oblong box-like portion projecting from the base and extending lengthwise of the same and confining an oblong outlet passage, the base being shaped to seat on a cylindrical exhaust pipe and to extend beyond the ends of the box-like portion, whereby the box-like portion and the outlet passage extends lengthwise of the exhaust pipe, a damper arranged in the box-like portion, a rock shaft arranged in the box-like portion and the outlet passage extending longitudinally of the box-like portion and also lengthwise of the damper, clamping means coacting with the projecting end portions of the base for holding the body onto the exhaust pipe and means at the end of the rock shaft for operating said rock-shaft, substantially as and for the purpose described.

In testimony whereof I affix my signature in the presence of two witnesses.

JOHN MOTT MORSE.

Witnesses:
MORELL K. BREWSTER,
MINNIE TRUPIN.